(12) United States Patent
Niedermeier et al.

(10) Patent No.: US 8,369,109 B2
(45) Date of Patent: Feb. 5, 2013

(54) SELF-OSCILLATING BIPOLAR TRANSISTOR DC/AC/DC CONVERTER USING A PULSE FORMING TIMER

(75) Inventors: Peter Niedermeier, München (DE); Bernd Rudolph, Forstern (DE)

(73) Assignee: Osram Gesellschaft mit beschrankter Haftung, Munich (DE)

( * ) Notice: Subject to any disclaimer, the term of this patent is extended or adjusted under 35 U.S.C. 154(b) by 371 days.

(21) Appl. No.: 12/514,448

(22) PCT Filed: Nov. 9, 2006

(86) PCT No.: PCT/EP2006/068276
§ 371 (c)(1),
(2), (4) Date: May 11, 2009

(87) PCT Pub. No.: WO2008/055545
PCT Pub. Date: May 15, 2008

(65) Prior Publication Data
US 2010/0073965 A1   Mar. 25, 2010

(51) Int. Cl.
*H02M 3/335* (2006.01)
(52) U.S. Cl. .......................................... 363/17; 363/132
(58) Field of Classification Search .................. 363/17, 363/132
See application file for complete search history.

(56) References Cited

U.S. PATENT DOCUMENTS 3,611,205 A * 10/1971 Ogawa et al. ............. 331/113 A
(Continued)

FOREIGN PATENT DOCUMENTS

GB     1 059 408     9/1967
GB     2 071 950     9/1981
(Continued)

OTHER PUBLICATIONS

S. Tietze, "Halbleiterschaltungstechnik", 2002, Springer Verlag, Berlin Heidelberg, XP002440954, pp. 893, 894 and 973.

(Continued)

*Primary Examiner* — Jeffrey Sterrett
(74) *Attorney, Agent, or Firm* — Cozen O'Connor

(57) ABSTRACT

A self-oscillating DC/DC converter comprising: a first and a second input connection for application of an input DC voltage; a first and a second bipolar transistor, wherein each bipolar transistor has a control electrode, a reference electrode and a working electrode; at least one first coupling capacitor; wherein a first switching junction is formed by the junction of the working electrode and the reference electrode of the first bipolar transistor, and a second switching junction is formed by the junction of the working electrode and the reference electrode of the second bipolar transistor, wherein the first and the second switching junctions are connected in series with respect to the input DC voltage; a rectifier, with an output that is coupled to a first and a second output connection in order to provide an output DC voltage; a transformer, which has a primary winding, a secondary winding and at least one control winding; wherein the primary winding is coupled between a galvanic connection of the first and the second switching junction and the at least one coupling capacitor; wherein the secondary winding is coupled to the input of the rectifier; wherein each bipolar transistor has an associated control winding which is coupled to the control electrode of the respective bipolar transistor and at least one timer, which is coupled between the respectively associated control winding and the respective control electrode.

10 Claims, 3 Drawing Sheets

U.S. PATENT DOCUMENTS

| | | | |
|---|---|---|---|
| 3,940,681 A * | 2/1976 | Ohsawa | 363/127 |
| 4,424,556 A * | 1/1984 | Maeda et al. | 363/17 |
| 4,847,746 A * | 7/1989 | Rilly et al. | 363/132 |
| 4,994,954 A * | 2/1991 | Katz et al. | 363/89 |
| 5,060,130 A | 10/1991 | Steigerwald | |
| 5,499,175 A | 3/1996 | Noro | |
| 5,592,367 A * | 1/1997 | Sugimori et al. | 363/17 |
| 5,729,446 A * | 3/1998 | Gruning | 363/58 |
| 5,737,207 A | 4/1998 | Uratani et al. | 363/132 |
| 6,373,731 B1 * | 4/2002 | Iwamura et al. | 363/56.05 |
| 6,504,732 B2 * | 1/2003 | Abe | 363/17 |
| 2004/0156216 A1 * | 8/2004 | Nagai et al. | 363/19 |
| 2010/0073965 A1 * | 3/2010 | Niedermeier et al. | 363/18 |

FOREIGN PATENT DOCUMENTS

| | | |
|---|---|---|
| WO | WO 94/17584 | 8/1994 |
| WO | WO 01/69978 | 9/2001 |

OTHER PUBLICATIONS

Tietze, Schenk, "Halbleiterschaltungstechnik", 12, Auflage, 2002, Springer Verlag Berlin, S. 104, 105, 117, 118, 119, 120, 121, 122, 123, 971, 972.

* cited by examiner

SELF-OSCILLATING BIPOLAR TRANSISTOR DC/AC/DC CONVERTER USING A PULSE FORMING TIMER

RELATED APPLICATIONS

This is a U.S. national stage of application No. PCT/EP2006/068276 filed Nov. 9, 2006.

FIELD OF THE INVENTION

1. Technical Field

The present invention relates to a self-oscillating DC/DC converter having a first and a second input connection for application of an input DC voltage, a first and a second bipolar transistor, wherein each bipolar transistor has a control electrode, a reference electrode and a working electrode, at least one coupling capacitor, wherein a first switching junction is formed by the junction of the working electrode and the reference electrode of the first bipolar transistor, and a second switching junction is formed by the junction of the working electrode and the reference electrode of the second bipolar transistor, wherein the first and the second switching junctions are connected in series with respect to the input DC voltage, a rectifier, whose output is coupled to a first and a second output connection in order to provide an output DC voltage. The invention furthermore relates to a method for provision of a DC voltage on a self-oscillating DC/DC converter such as this.

2. Background of the Invention

Electronic control circuits, as well as other loads such as appliances for entertainment electronics or else LEDs, normally require a low DC voltage for their supply. One problem that occurs repeatedly in this case is to produce this voltage from an available mains AC voltage in an efficient and cost-effective manner. Furthermore, there is virtually always a requirement to produce this low DC voltage at a potential isolated from the mains system, and in many applications even to provide a safety extra low voltage (SELV). Although, as mentioned, the fundamental problem is to produce the desired low DC voltage from the mains AC voltage, the following statements are, however, based on the assumption that a DC voltage has already been provided, from which the low DC voltage can then be produced.

This assumption can be made for many appliances, for example the so-called intermediate circuit voltage, which represents a DC voltage with an amplitude of between 200 and 400 volts, is frequently available in electronic ballasts for lamps. If this input DC voltage is not available, it must be produced in a known manner using a mains rectifier and an energy-storage capacitor, possibly with the inclusion of an arrangement for power factor correction (PFC), in order then to make it possible for this to supply the DC/DC converter according to the invention.

A further constraint results from the fact that, even today, the cheapest MOSFET transistors are more expensive by a factor of 10 than comparable bipolar transistors. It is therefore desirable to design the self-oscillating DC/DC converter according to the invention using bipolar transistors.

Known solutions to produce a low DC voltage from the mains voltage use, for example, a conventional mains transformer. This is, in particular, heavy and voluminous, and cheap designs frequently have a disadvantageous stray magnetic field. A so-called flyback converter may be used to achieve the desired potential isolation in switched-mode power supplies, which is actually the standard solution and allows potential isolation.

However, there are a number of problems in this case: on the one hand, the electronic switches which are used in the flyback converter must have a withstand voltage which corresponds to at least twice the peak mains voltage. It must be relatively fast, for good control and low switching-off losses, as a result of which, in practice, the only feasible solution for the electronic switch is a MOSFET. For a central-european mains system, the MOSFET must have a blocking voltage of at least 800 V, and is therefore very expensive. If the transformer that is used for the flyback converter is also intended to have SELV characteristics, then a bifilar winding structure between the primary winding and the secondary winding, which results in minimal stray inductances, is impossible because of the air gaps and creepage distances which need to be complied with, and the isolation which needs to be complied with. However, because the stray inductances are then considerable, it is necessary to use a MOSFET with even greater voltage resistance. In general, however, complex and, in particular, lossy, switching load reduction is used for the MOSFET (snubber).

Switched-mode power supplies using a half-bridge or bridge arrangement are known from the prior art, for example from WO 01/69978 and U.S. Pat. No. 5,060,130.

SUMMARY OF THE INVENTION

One object of the present invention is to provide the self-oscillating DC/DC converter as mentioned above such that it can be produced using bipolar transistors and it is possible to provide the low DC voltage at a potential isolated from the mains system, using a transformer, for SELV criteria. A further object is to provide a corresponding method for provision of a DC voltage.

The present invention takes into consideration the discovery that the variations in the switching-off delay which occur to a greater extent in the case of bipolar transistors than with MOSFET transistors and result in it being virtually impossible to control the timing, can be effectively countered by driving the bipolar transistors via a specific, pulse-forming timer. In particular, the present invention therefore overcomes the problem of fluctuations in the current gain of different transistors within one type. This is because the use of a skillfully designed timer results in variance in the switching-off delay, which is caused by varying storage effects, becoming a completely secondary factor, thus allowing switching with precise timing with bipolar transistors as well.

The use of a transformer, which has a primary winding, a secondary winding and at least one control winding, wherein each bipolar transistor has an associated control winding which is coupled to the control electrode of the respective bipolar transistor makes it possible to provide a low voltage at a potential isolated from the mains system, in a simple manner, which even complies with SELV criteria. Even if the transformer were to be designed with a multichamber structure the increased stray inductances which would result from this would have no negative effect on the operation of the circuit; they even ensure a reduction in the switching-on load on the respective switch to be switched on, and can replace the inductances, provided in a discrete form, in the at least one timer.

The present invention makes it possible to produce a self-oscillating DC/DC converter using extremely cost-effective standard components, for example the bipolar transistors MPSA42 and STPSA42 for output powers up to about 10 W.

Furthermore, this is distinguished by better EMC characteristics than a flyback converter, particularly when radio-frequency interference (>1 MHz) is in practice for the first time scarcely produced at all by the bipolar transistors, as a result of the use of a trapezoidal capacitor.

High efficiency is a further advantage of a DC/DC converter according to the invention, since it does not contain any snubber and, in contrast to a flyback converter, the transformer is magnetized symmetrically and can therefore be operated either at a lower level (reduced losses), or else allows higher power densities.

The design according to an embodiment of the invention of the at least one timer and its pulse-forming effect on the base current of the bipolar transistors furthermore minimizes the influence of the storage time of the bipolar transistors on the oscillation frequency and, in particular, the effect of the scatter between different manufacturer batches.

In this case, one procedure has been found to be particularly advantageous, in which the switching-off time is defined by the time at which the voltage at the output of the respective timer falls below the forward voltage of the junction of the control electrode and the reference electrode of the respective bipolar transistor.

If the first and the second bipolar transistors have the same zone sequence, a first control winding and a first timer are provided for the first bipolar transistor, and a second control winding and a second timer are provided for the second bipolar transistor. In the situation in which the first and the second bipolar transistors have a different zone sequence, it is sufficient to provide a first control winding and a first timer for the first and the second bipolar transistors.

It is preferable to provide negative feedback, in particular current series negative feedback, for the first and the second bipolar transistors, thus reducing the effects of temperature fluctuations on the oscillation frequency and also reducing the punch-through from the input voltage onto the output voltage.

The reference electrode of the first bipolar transistor is preferably coupled to a first reference potential, and the reference electrode of the second bipolar transistor is preferably coupled to a second reference potential, wherein the negative feedback comprises a non-reactive resistor, which is coupled between the respective reference electrode and the respective reference potential.

The at least one timer preferably comprises a first non-reactive resistor and a capacitor connected in series. In this case, the non-reactive resistor is used in particular for current limiting since, otherwise, the current which is created solely on the basis of the capacitor and will be proportional to the rate of change of the voltage across the capacitor, could become too high and could therefore destroy the bipolar transistor.

The at least one timer furthermore preferably comprises an inductance, which is arranged in series with the first non-reactive resistor and the capacitor, which are connected in series. This inductance is used for reducing the switching-on load, and therefore creates a predeterminable delay to the process of switching on the associated transistor.

The at least one timer furthermore particularly preferably has a second non-reactive resistor, which is connected in parallel with the path from the control electrode to the reference potential of the respective bipolar transistor. A portion of the current which is fed in from the associated control winding is accordingly dissipated in the second non-reactive resistor with respect to the reference potential. This allows the voltage dropped across the second non-reactive resistor to be related to the forward voltage on the respective transistor. In particular, the undershooting of the forward voltage can be set precisely—and therefore the switching-on time of the associated transistor and in consequence the oscillation frequency of the inverter. This therefore for the first time allows precise design of a DC/DC converter according to the invention, and in particular the transformer.

Finally, it is preferable for the reference electrode of the first bipolar transistor to be coupled to a first reference potential, and for the reference electrode of the second bipolar transistor to be coupled to a second reference potential, wherein a first diode is coupled in parallel with the path from the control electrode to the reference potential of the first bipolar transistor, and a second diode is coupled in parallel with the path from the control electrode to the reference potential of the second bipolar transistor, wherein the first and the second diodes, in conjunction with the respective bipolar transistors, allow demagnetization of the transformer (freewheeling phase).

For applications in which a DC/DC converter according to the invention is not intended to be connected to an AC voltage mains system via a mains switch, for example in entertainment electronics, it is furthermore, preferable for the DC/DC converter to be actively switched on and off via a bistable stop circuit, for example as described in EP 0 648 068. This circuit configuration ensures very low losses in the switched-off state (standby), as a result of which the power consumption is then also well below 1 W.

Further advantageous embodiments result from the dependent claims. The advantageous embodiments and their advantages as mentioned with reference to the self-oscillating DC/DC converter according to the invention apply, where applicable, in a corresponding manner to the method according to the invention.

BRIEF DESCRIPTION OF THE DRAWING(S)

Two exemplary embodiments of a self-oscillating DC/DC converter according to the invention will now be described in more detail in the following text with reference to the attached drawings, in which.

PREFERRED EMBODIMENT OF THE INVENTION

Figure 1:
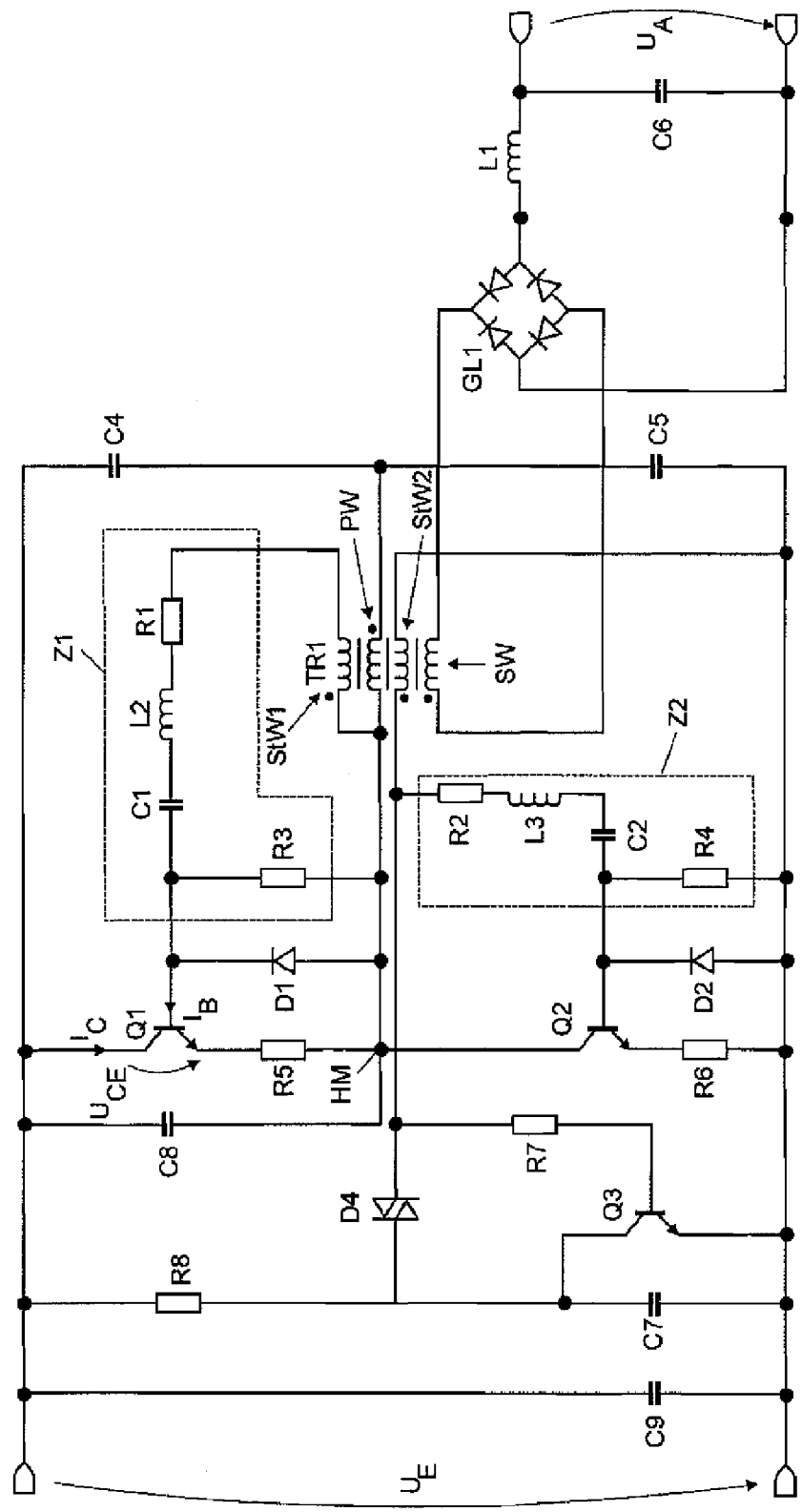
FIG. 1 shows a schematic illustration of the design of a first embodiment of a self-oscillating DC/DC converter according to the invention.

FIG. 1 shows a schematic illustration of a circuit diagram of a first exemplary embodiment of a self-oscillating DC/DC converter according to the invention. In this case, an input DC voltage $U_E$ is applied to the input. This preferably represents the so-called intermediate circuit voltage. As those skilled in the art will be aware, this intermediate circuit voltage is normally derived from the mains voltage using a rectifier and an energy-storage capacitor, represented in the present case as the energy-storage capacitor C9. Filters and PFC (power factor correction) measures may optionally be provided.

The DC/DC converter according to the invention as illustrated in FIG. 1 comprises a first bipolar transistor Q1 and a second bipolar transistor Q2 arranged to form a half-bridge. Two capacitors C4, C5 are used as coupling capacitors. The DC/DC converter also comprises a diac D4, which generates start pulses from the capacitor C7, in order to allow the self-oscillating DC/DC converter to be started. The non-reactive resistor R8 is used to charge the capacitor C7. Once the DC/DC converter has been started, that is to say after detection of a cyclic oscillation, the capacitor C7 is discharged using the switch Q3 and the non-reactive resistor R7. A capacitor C8 acts in a known manner as a trapezoidal capacitor, that is to say it draws the current during the time during which the two transistors Q1, Q2 are switched off, and is therefore used to reduce the switching-off load.

The DC/DC converter according to the invention has a transformer TR1 which comprises a primary winding PW, secondary winding SW, a first control winding StW1 and a second control winding StW2. In this case, the primary winding PW is coupled between the half-bridge center point HM and the connection point of the two coupling capacitors C4, C5. The secondary winding is connected to the input of a rectifier GL1, whose output is coupled to an LC element, which comprises the inductance L1 and the capacitor C6, is used to filter out any radio-frequency components, and produces the output DC voltage $U_A$.

A timer Z1 is connected between the control winding StW1 and the base of the transistor Q1, and a timer Z2 is connected between the control winding StW2 and the base of the transistor Q2. Each timer Z1, Z2 comprises a capacitor C1, C2, an inductance L2, L3 and a non-reactive resistor R1, R2, respectively, connected in series. A non-reactive resistor R5, R6 is connected between the emitter connection and the reference potential of each respective switch Q1, Q2 in the half-bridge, providing current series negative feedback and therefore, in addition to other effects, reducing the temperature dependency of the switches Q1, Q2. Two components are connected in parallel, in parallel with the respective path between the reference electrode and the reference potential of the transistors Q1, Q2: firstly a diode D1, D2 which allows freewheeling of the respectively associated transistor Q1, Q2 by use of the inverse-current mode of the transistors. Since they are not themselves active in the active phase of the respective switch Q1, Q2, they have no effect on the control electrode of the respective switch Q1, Q2. Secondly a non-reactive resistor R3, R4, which draws a component of the current supplied from the associated control winding StW1, StW2 and thus allows accurate setting of the switching-off time of the respective transistor Q1, Q2.

According to one exemplary embodiment, which is not illustrated, the output rectifier GL1 may also be in the form of a center-point circuit. This variant is particularly advantageous for relatively high output currents.

Furthermore, a plurality of secondary windings SW may be provided in order to provide a plurality of DC voltages, in particular DC voltages with a different amplitude.

Figure 2:
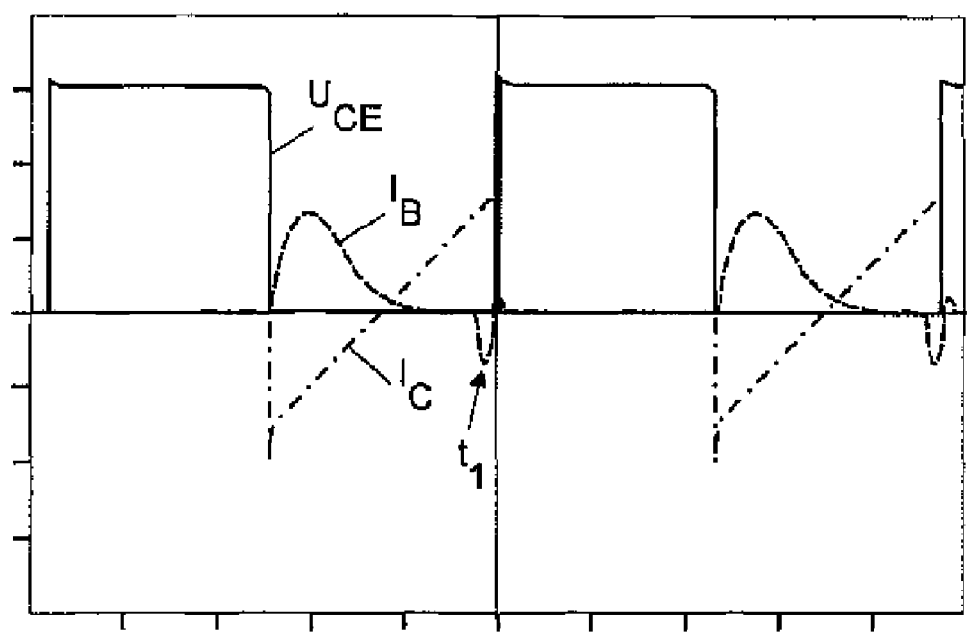
FIG. 2 shows the waveform of the voltage $U_{CE}$, of the current $I_C$ and of the current $I_B$, for the self-oscillating DC/DC converter as shown in FIG. 1.

FIG. 2 shows the waveform of a number of variables using the example of the switch Q1 from FIG. 1. The waveform of the corresponding variables on the switch Q2 corresponds to those illustrated in FIG. 2, just offset through half one cycle. First of all, the rectangular waveform of the collector-emitter voltage $U_{CE}$ of the transistor Q1 can clearly be seen. In the phases in which a base current $I_B$ flows which is sufficient to keep the transistor Q1 switched on, a collector current $I_C$ flows, and the voltage $U_{CE}$ decreases to virtually zero. The areas in which the amplitude of the collector current $I_C$ is negative are due to the inverse current or freewheeling current. The negative amplitude of the base current $I_B$ at the time t1 (emphasized in FIG. 2) results from stored charge flowing out of the base connection via R3 when the base-emitter forward voltage $U_{BE}$ is undershot, and is used to clear charge carriers out of the base of the switch Q1 and therefore to switch the transistor Q1 off in a defined manner.

Figure 3:
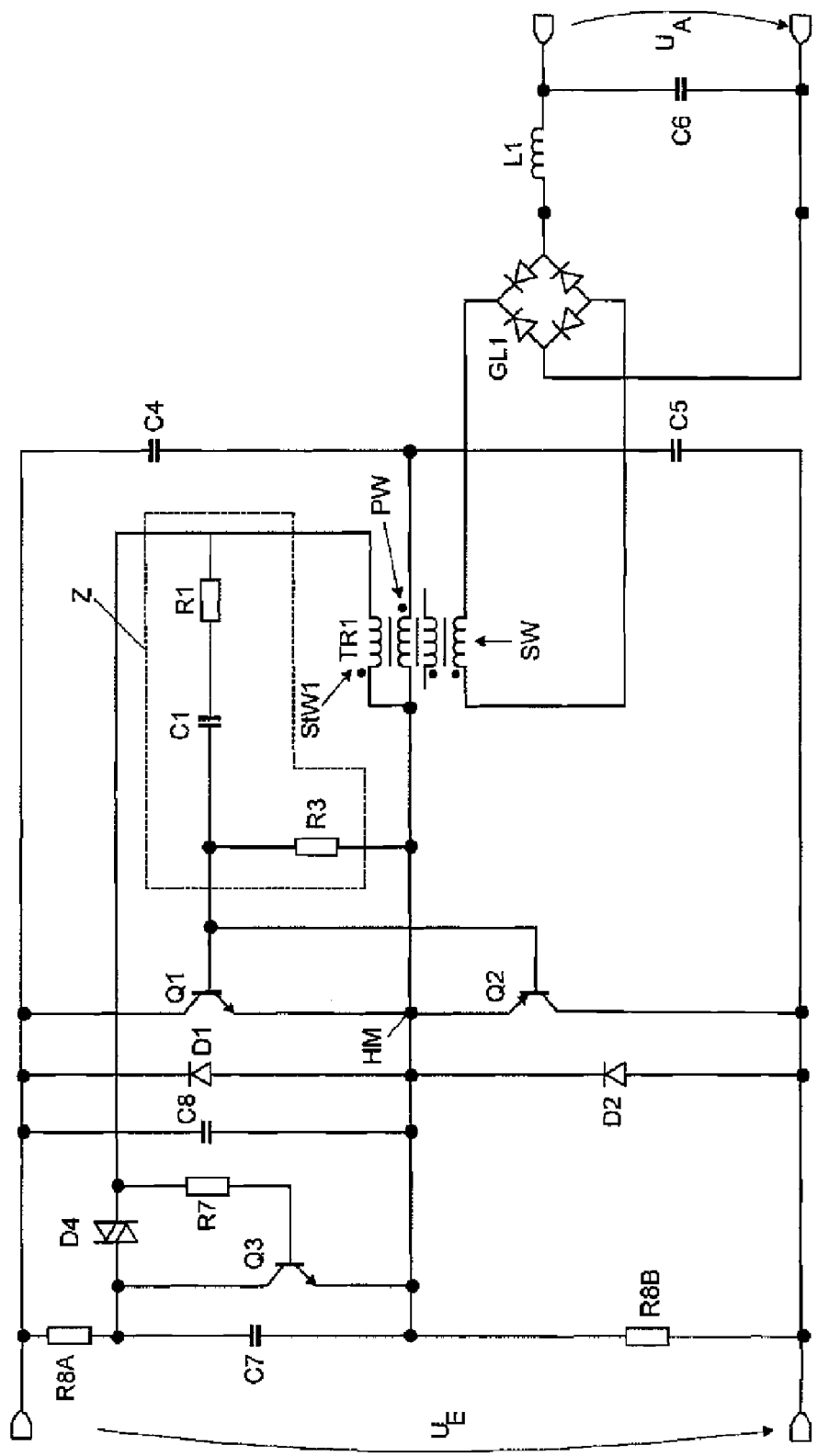
FIG. 3 shows a schematic illustration of the design of a second embodiment of a self-oscillating DC/DC converter according to the invention.

FIG. 3 shows a second exemplary embodiment of a DC/DC converter according to the invention, in which the reference symbols introduced with reference to FIG. 1 are used again for corresponding components, which will therefore not be described again, with the non-reactive resistor R8 that is known from FIG. 1 having been split into the two non-reactive resistors R8A and R8B. In the illustrated exemplary embodiment, the transistors Q1, Q2 in the half-bridge arrangement have a complementary zone sequence. To this extent, it is sufficient to provide a single control winding StW1 and a single timer Z, which in the present case comprises the non-reactive resistor R1, the capacitor C1 and the non-reactive resistor R3.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A self-oscillating DC/DC converter comprising:
a first and a second input connection for application of an input DC voltage;
a first and a second bipolar transistor, each bipolar transistor having a control electrode, a reference electrode, a working electrode, and negative feedback comprising resistors provided for the first and the second bipolar transistors;
at least one first coupling capacitor;
wherein a first switching junction is formed by the junction of the working electrode and the reference electrode of the first bipolar transistor, and a second switching junction is formed by the junction of the working electrode and the reference electrode of the second bipolar transistor, wherein the first and the second switching junctions are connected in series with respect to the input DC voltage;
a rectifier, with an output that is coupled to a first and a second output connection in order to provide an output DC voltage;
a transformer, which has a primary winding, a secondary winding and at least one control winding;
wherein the primary winding is coupled between a galvanic connection of the first and the second switching junction and the at least one coupling capacitor;
wherein the secondary winding is coupled to the input of the rectifier;
wherein each bipolar transistor has an associated control winding which is coupled between the control electrode of a respective bipolar transistor and the galvanic connection, and at least one timer which is coupled between a respectively associated control winding and a respective control electrode; and
wherein the at least one timer comprises a first non-reactive resistor, an inductance and a capacitor connected in series.

2. The DC/DC converter as claimed in claim 1, wherein the at least one timer is adapted to define the switching-off time of the respective bipolar transistor.

3. The DC/DC converter as claimed in claim 2, wherein the switching-off time is defined in that the voltage at the output of the respective timer falls below the forward voltage of the junction of the control electrode and reference electrode of the respective bipolar transistor.

4. The DC/DC converter as claimed in claim 1, wherein the first and the second bipolar transistors have the same zone sequence, wherein a first control winding and a first timer are provided for the first bipolar transistor, and a second control winding and a second timer are provided for the second bipolar transistor.

5. The DC/DC converter as claimed in claim 1, wherein the first and the second bipolar transistors have a different zone sequence, wherein a first control winding and a first timer are provided for the first and the second biopolar transistors.

6. The DC/DC converter as claimed in claim 1, wherein the reference electrode of the first bipolar transistor is coupled to a first reference potential, and the reference electrode of the second bipolar transistor is coupled to a second reference potential, wherein a first diode is coupled in parallel with the path from the control electrode to the reference potential of the first bipolar transistor, and a second diode is coupled in parallel with a path from the control electrode to the reference potential of the second bipolar transistor, wherein the first and the second diodes are arranged in a freewheeling arrangement.

7. The DC/DC converter as claimed in claim 1, wherein the reference electrode of the first bipolar transistor is coupled to a first reference potential, and the reference electrode of the second bipolar transistor is coupled to a second reference potential, wherein the negative feedback comprises a second non-reactive resistor, which is coupled between the respective reference electrode and the respective reference potential.

8. The DC/DC converter as claimed in claim 1, wherein the at least one timer also has a second non-reactive resistor, which is connected in parallel with the path from the control electrode to the reference potential of the respective bipolar transistor.

9. A method for provision of a DC voltage on a self-oscillating DC/DC converter having a first and a second input connection for application of an input DC voltage, a first and a second bipolar transistor, wherein each bipolar transistor has a control electrode, a reference electrode, a working electrode, and negative feedback provided for the first and the second bipolar transistors, at least one first coupling capacitor, wherein a first switching junction is formed by the junction of the working electrode and the reference electrode of the first bipolar transistor, and a second switching junction is formed by the junction of the working electrode and the reference electrode of the second bipolar transistor, wherein the first and the second switching junctions are connected in series with respect to the input DC voltage, a rectifier with an output that is coupled to a first and a second output connection in order to provide an output DC voltage, a transformer which has a primary winding, a secondary winding and at least one control winding, wherein the primary winding is coupled between a galvanic connection of the first and the second switching junctions and the at least one coupling capacitor, wherein the secondary winding is coupled to the input of the rectifier, wherein each bipolar transistor has a respectively associated control winding, which is coupled between the control electrode of the respective bipolar transistor and the galvanic connection, wherein the method comprises:

defining the switching-off time of the first and of the second bipolar transistors by a respectively associated timer which is coupled between the respectively associated control winding and the respective control electrode; and providing in the respectively associated timer a first non-reactive resistor, an inductance and a capacitor connected in series.

10. A self-oscillating DC/DC converter comprising:
a first and a second input connection for application of an input DC voltage;
a first and a second bipolar transistor, wherein each bipolar transistor has a control electrode, a reference electrode, a working electrode, and negative feedback provided for the first and the second bipolar transistors;
at least one first coupling capacitor;
wherein a first switching junction is formed by the junction of the working electrode and the reference electrode of the first bipolar transistor, and a second switching junction is formed by the junction of the working electrode and the reference electrode of the second bipolar transistor, wherein the first and the second switching junctions are connected in series with respect to the input DC voltage;
a rectifier, with an output that is coupled to a first and a second output connection in order to provide an output DC voltage;
a transformer, which has a primary winding, a secondary winding and at least one control winding;
wherein the primary winding is coupled between a galvanic connection of the first and the second switching junction and the at least one coupling capacitor;
wherein the secondary winding is coupled to the input of the rectifier;
wherein each bipolar transistor has an associated control winding which is coupled between the control electrode of a respective bipolar transistor and the galvanic connection, and at least one timer which is coupled between the respectively associated control winding and a respective control electrode;
wherein the reference electrode of the first bipolar transistor is coupled to a first reference potential, and the reference electrode of the second bipolar transistor is coupled to a second reference potential, wherein the negative feedback comprises a first non-reactive resistor which is coupled between a respective reference electrode and a respective reference potential; and
wherein the at least one timer includes a second non-reactive resistor which is connected in parallel with a path from the control electrode to a reference potential of the respective bipolar transistor, and a third non-reactive resistor, an inductance, and a capacitor connected in series.

* * * * *